United States Patent
Yoshida (10) Patent No.: US 7,848,027 B2
(45) Date of Patent: Dec. 7, 2010

(54) OBJECTIVE LENS

(75) Inventor: Miwako Yoshida, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/724,307

(22) Filed: Mar. 15, 2010

(65) Prior Publication Data

US 2010/0172034 A1 Jul. 8, 2010

Related U.S. Application Data

(63) Continuation of application No. PCT/JP2008/067373, filed on Sep. 18, 2008.

(30) Foreign Application Priority Data

Sep. 25, 2007 (JP) ............................. 2007-246471

(51) Int. Cl.
*G02B 21/02* (2006.01)
(52) U.S. Cl. ..................... 359/656; 359/657; 359/658
(58) Field of Classification Search .......... 359/656–661
See application file for complete search history.

(56) References Cited

U.S. PATENT DOCUMENTS

| 5,631,779 A | 5/1997 | Kashima |
| 7,593,157 B2 * | 9/2009 | Suzuki et al. ............... 359/380 |

FOREIGN PATENT DOCUMENTS

| JP | 6-347700 A | 12/1994 |
| JP | 2001-305431 A | 10/2001 |
| JP | 3312057 B2 | 5/2002 |

* cited by examiner

*Primary Examiner*—Scott J Sugarman
(74) *Attorney, Agent, or Firm*—Miles & Stockbridge P.C.

(57) ABSTRACT

An objective lens OL includes, in order from an object, a first lens group G1 having positive refractive power, a second lens group G2 having positive refractive power, a diffractive optical element GD forming a diffractive optical surface D thereon, and a third lens group G3 having negative refractive power. The first lens group G1 includes at least one cemented lens and the most object side surface thereof forms a concave surface facing the object. The second lens group G2 includes at least one cemented lens. The third lens group G3 includes at least one cemented negative lens. In the objective lens OL, a principal ray crosses an optical axis between the second lens group G2 and the third lens group G3, and in the diffractive optical element GD, the diffractive optical surface D is disposed in the vicinity of the position where the principal ray crosses the optical axis.

4 Claims, 6 Drawing Sheets

OBJECTIVE LENS

CROSS-REFERENCE TO RELATED APPLICATION

This application is a continuation of International Application No. PCT/JP2008/067373 filed Sep. 18, 2008.

TECHNICAL FIELD

The present invention relates to an objective lens used for an optical system such as a microscope.

BACKGROUND ART

In an observation using a microscope, it is necessary to observe a sample in a natural color, so that an objective lens with highly corrected chromatic aberration has been expected. Moreover, in order to make the handling of the sample easy, an objective lens keeping a working distance as long as possible has been expected. However, when a long working distance is to be secured, the object side focal length of the objective lens has to be long, and a negative lens group having strong refractive power has to be disposed to the image side, so that chromatic aberration naturally becomes worse. Accordingly, recently, there have been proposed various objective lenses using a diffractive optical element in order to highly correct chromatic aberration (see, for example, Japanese Patent Publication No. 3312057).

However, the objective lens whose chromatic aberration is highly corrected has had insufficient working distance for industrial use, and large undulation in spherical aberration and coma.

DISCLOSURE OF THE INVENTION

The present invention is made in view of aforementioned problems, and has an object to provide an objective lens having a long working distance capable of being used for industrial purpose and having chromatic aberration thereof being highly corrected.

In order to solve the problems, according to the present invention, there is provided an objective lens comprising, in order from an object side, a first lens group having positive refractive power, a second lens group having positive refractive power, a diffractive optical element having a diffractive optical surface, and a third lens group having negative refractive power. The first lens group includes at least one cemented lens and the most object side surface thereof forms a concave surface facing the object side. The second lens group includes at least one cemented lens. The third lens group includes at least one cemented negative lens. In the objective lens, a principal ray crosses an optical axis between the second lens group and the third lens group, and the diffractive optical element is disposed such that the diffractive optical surface is disposed in the vicinity of the position where the principal ray crosses the optical axis. The objective lens satisfies the following conditional expressions:

$$h < \alpha \times L \times 0.3$$

$$H < [H3 + \{\phi/(2 \times fa) + H3/|f3|\} \times L] \times 0.85$$

where $\alpha = \phi/2 \times \{1/fa - (L/f12 - 1)/|f3|\}$, $H3 = fa \times NA$, h denotes the maximum height of a principal ray on the diffractive optical surface, $\phi$ denotes a real field of view, L denotes a distance along the optical axis between the second lens group and the third lens group, fa denotes a focal length of the objective lens, H denotes the maximum effective radius on the diffractive optical surface, NA denotes a numerical aperture, f12 denotes a combined focal length of the first lens group and the second lens group, and f3 denotes a focal length of the third lens group.

In the objective lens according to the present invention, it is preferable that the following conditional expression is satisfied:

$$|\Phi| < 0.025$$

where $\Phi = (n2 - n1)/r$, r denotes a radius of curvature of each cemented surface of cemented lenses included in the first lens group and the second lens group, n1 denotes a refractive index at d-line of a medium disposed to the object side of the cemented surface, and n2 denotes a refractive index at d-line of a medium disposed to the image side of the cemented surface, and $\Phi$ denotes power of the cemented surface.

In the objective lens according to the present invention, it is preferable that the following conditional expression is satisfied:

$$1 < |f3/fa| < 5$$

where fa denotes a focal length of the objective lens, and f3 denotes a focal length of the third lens group.

When the objective lens according to the present invention is constructed as described above, it becomes possible to provide an objective lens having a long working distance and chromatic aberration thereof being highly corrected.

EMBODIMENT FOR CARRYING OUT THE INVENTION

A preferred embodiment of the present invention is explained with reference to accompanying drawings. At first, a configuration of an objective lens according to the present invention is explained with reference to FIG. 1. The objective lens OL includes, in order from an object side, a first lens group G1 having positive refractive power, a second lens group G2 having positive refractive power, and a third lens group G3 having negative refractive power, and a diffractive optical element GD is disposed between the second lens group G2 and the third lens group G3.

In such an objective lens OL, the first lens group G1 includes at least one achromatic lens (a cemented lens composed of the lenses L2 and L3 shown in FIG. 1) constructed by a positive lens cemented with a negative lens. In order not to generate spherical aberration as far as possible, the most object side lens surface is a positive meniscus lens having a concave surface facing the object side (lens L1 shown in FIG. 1). This is to prevent an angle of incidence of the light ray with respect to the lens surface from becoming large as far as possible even to a light ray corresponding to a high numerical aperture.

Figure 1:
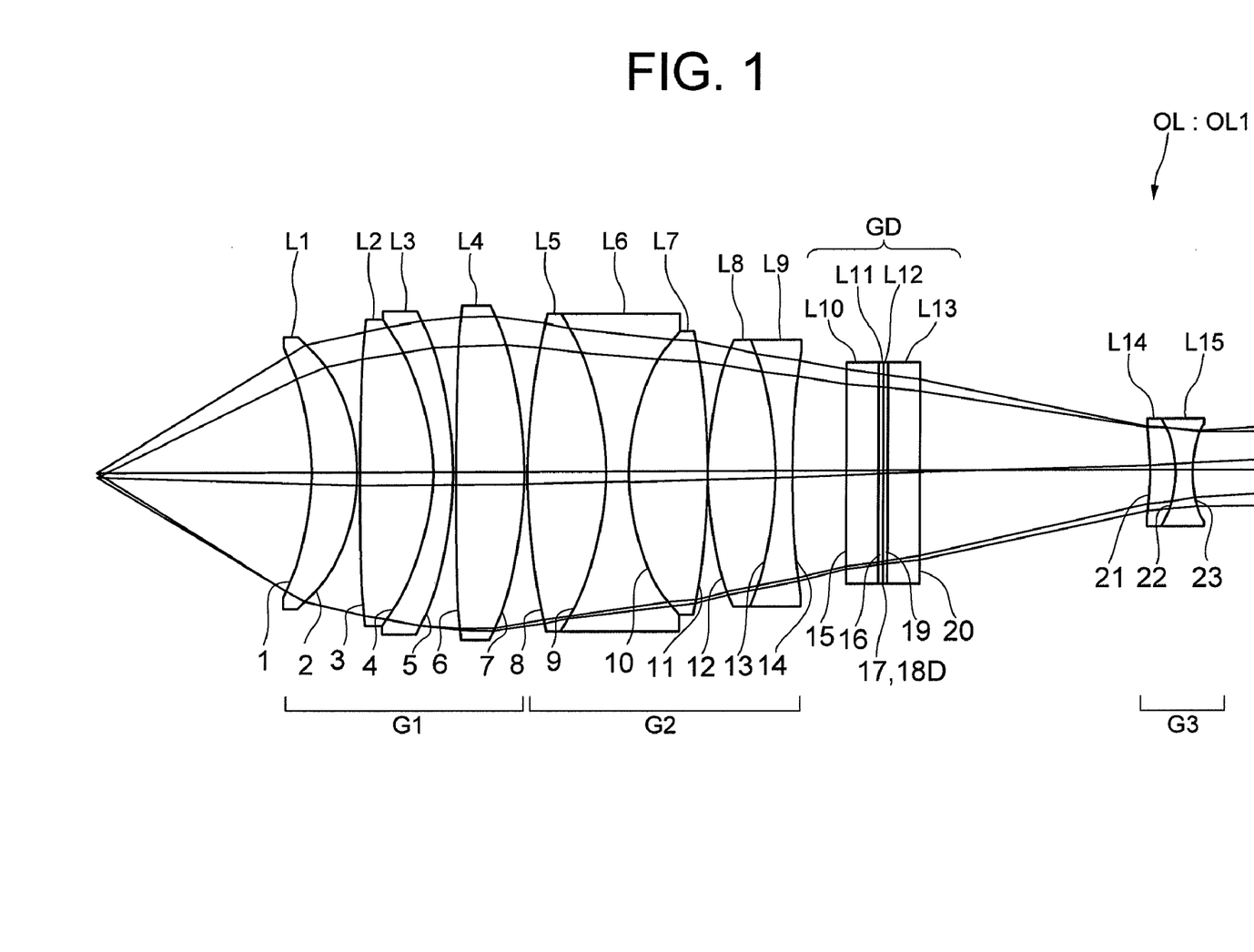
FIG. 1 is a schematic diagram showing a lens construction of an objective lens according to Example 1 of the present invention.

The second lens group G2 includes at least one achromatic lens (a cemented lens composed of lenses L5, L6 and L7 and a cemented lens composed of lenses L8 and L9 shown in FIG. 1) constructed by a positive lens cemented with a negative lens. Moreover, the third lens group G3 includes at least one cemented negative lens (a cemented lens composed of lenses L14 and L15 shown in FIG. 1) constructed by a positive lens cemented with a negative lens.

The diffractive optical element GD is constructed such that an optical glass L10, two optical members L11 and L12 each made from different resin materials, and an optical glass L13 are cemented with each other in this order, and a diffraction grating is formed on a cemented surface between the optical members L11 and L12 (hereinafter the cemented surface is called as a "diffractive optical surface D"). The diffractive optical element GD (the diffractive optical surface D) has a negative dispersion value (Abbe number=−3.453), large dispersion, and strong anomalous dispersion property (partial dispersion ratio (ng−nF)/(nF−nC)=0.2956), so that it has strong ability to correct chromatic aberration. Although Abbe number of ordinary optical glass is about 30 to 80, Abbe number of the diffractive optical element GD is a negative value. In other words, in the diffractive optical element GD, the longer the wavelength of light, the larger the angle of deflection. Accordingly, it becomes possible to excellently correct chromatic aberration, which cannot be accomplished by ordinary optical glasses. The objective lens according to the present embodiment is composed of a small number of lenses with using the diffractive optical element having negative dispersion property formed by resin materials without using large number of expensive optical materials such as ED glass and fluorite. Incidentally, an advantage that the optical members L11 and L12 composing the diffractive optical surface D are formed by resin materials is that a diffraction grating can be formed by using a mold and ultraviolet setting easier than ordinary optical glass.

Here, light rays are narrowed down by the first lens group G1 and the third lens group G3, and a light ray passing through the center of light rays emanated from each object height is defined as a principal ray. In the objective lens OL according to the present embodiment, the principal ray crosses an optical axis between the second lens group G2 and the third lens group G3. In the diffractive optical element GD, the diffractive optical surface D is disposed in the vicinity of a position where the principal ray crosses the optical axis.

Then, conditional expressions for constructing the objective lens OL according to the present invention are explained below. In the objective lens OL, when the maximum height of the principal ray on the diffractive optical surface D of the diffractive optical element GD is denoted by h, a distance along the optical axis between the second lens group G2 and the third lens group G3 is denoted by L, a focal length of the objective lens OL is denoted by fa, a combined focal length of the first lens group G1 and the second lens group G2 is denoted by f12, and a focal length of the third lens group G3 is denoted by f3, the following conditional expression (1) determined in view of real field of view φ is satisfied:

$$h < \alpha \times L \times 0.3 \quad (1)$$

where $\alpha = \phi/2 \times \{1/fa - (L/f12 - 1)/|f3|\}$.

In the objective lens OL according to the present embodiment, when the maximum effective radius of the diffractive optical surface D of the diffractive optical element GD is denoted by H, the following conditional expression (2) in view of a numerical aperture NA and the real field of view φ is satisfied:

$$H < [H3 + \{\phi/(2 \times fa) + H3/|f3|\} \times L] \times 0.85 \quad (2)$$

where $H3 = fa \times NA$.

The diffractive optical element GD mainly corrects longitudinal chromatic aberration including secondary spectrum, so that it becomes necessary to keep a delicate balance with correction of lateral chromatic aberration and chromatic change in spherical aberration. Conditional expression (1) defines the maximum height of principal ray on the diffractive optical surface D of the diffractive optical element GD. In the objective lens OL according to the present embodiment, since the working distance is secured to be long, correction of longitudinal chromatic aberration becomes difficult. Conditional expression (1) is for predominantly correcting longitudinal chromatic aberration on the diffractive optical surface D of the diffractive optical element GD without affecting off-axis light rays. On the other hand, conditional expression (2) is for defining the maximum effective diameter of the light ray passing through the diffractive optical surface D of the diffractive optical element GD. When the diffractive optical element GD (diffractive optical surface D) is disposed at a position where the effective diameter is large, high order spherical aberration and coma are generated, so that conditional expression (2) is necessary to be satisfied.

In the objective lens OL according to the present embodiment, when the power of a cemented surface of the cemented lens included in the first lens group G1 and the second lens group G2 is denoted by Φ, the following conditional expression (3) is preferably satisfied:

$$|\Phi| < 0.025 \quad (3).$$

Here, power Φ of the cemented surface is shown by following expression (f):

$$\Phi = (n2 - n1)/r \quad (f)$$

where n1 denotes a refractive index of an optical member disposed to the object side of the cemented surface (a first medium) at d-line (588 nm), n2 denotes a refractive index of an optical member disposed to the image side of the cemented surface (a second medium) at d-line (588 nm), and r denotes a radius of curvature of the cemented surface.

Conditional expression (3) defines a condition of power of the cemented surface of a cemented lens included in the first lens group G1 and the second lens group G2. When the power exceeds the upper limit of this conditional expression, chromatic difference in spherical aberration and coma are generated.

Moreover, in the objective lens OL according to the present embodiment, a focal length fa of the objective lens and a focal length f3 of the third lens group G3 are preferably satisfies the following conditional expression (4):

$$1 < |f3/fa| < 5 \quad (4).$$

Conditional expression (4) defines power of the third lens group G3. When the value falls below the lower limit of conditional expression (4), power of the third lens group becomes strong, then power of the front lens group has to be strengthened, so that spherical aberration and coma become worse. On the other hand, when the value of conditional expression (4) exceeds the upper limit, power of front lens group has to be weakened, and a distance between the front lens group and the rear lens group has to be larger, so that the working distance cannot be made longer upon considering parfocality.

EXAMPLE

Three Examples of the objective lens OL according to the present invention are shown below. In each Example, phase difference of the diffractive optical surface D formed on the diffractive optical element GD is calculated by a super-high-refractive-index method carried out by using ordinary refractive index and an aspherical surface expression (g) explained later. The super-high-refractive-index method uses a fixed equivalent relation between an aspherical shape and a grating pitch of the diffractive optical surface. In the present Example, the diffractive optical surface D is shown as data of the super-high-refractive-index method by the aspherical expression (g) explained later and coefficients thereof. In the present Example, as for calculating aberration characteristics, d-line, g-line, C-line, and F-line are selected. Wavelengths of d-line, g-line, C-line, and F-line used in the present Example and values of refractive indices of the diffractive optical surface D used for calculating the super-high-refractive-index method set with respect to each spectrum line are shown in the following Table 1.

TABLE 1

| | wavelength | refractive index (derived by super-high-refractive-index method) |
|---|---|---|
| d-line | 587.562 nm | 10001 |
| C-line | 656.273 nm | 11170.4255 |
| F-line | 486.133 nm | 8274.7311 |
| g-line | 435.835 nm | 7418.6853 |

In each Example, an aspherical surface is expressed by the following expression (g):

$$S(y)=(y^2/r)/\{1+(1-Kxy^2/r^2)^{1/2}\}+C2xy^2+C4xy^4+C6x y^6+C8xy^8+C10xy^{10}+ \quad (g)$$

where y denotes a height in the vertical direction from the optical axis, S(y) denotes a distance (sag amount) along the optical axis between a tangent plane of the vertex of the aspherical surface and the aspherical surface at the height of y, r denotes a radius of curvature of a reference sphere (radius of curvature of the vertex), K denotes a conical coefficient, and Cn denotes an aspherical coefficient of n-th order. Paraxial radius of curvature R is expressed by the following expression (h):

$$R=1/(1/r+2C2) \quad (h).$$

In each Example, a lens surface where the diffractive optical surface is formed is shown by attaching "*" to the right side of the surface number, and the aspherical expression (g) shows various aspects of the property of the diffractive optical surface.

An objective lens OL shown in each Example is an infinity correction type system and is used together with an imaging lens having specifications shown in Table 2. Incidentally, in Table 2, the first column "m" denotes each lens surface number counted in order from the object side, the second column "r" denotes a radius of curvature of each optical surface, the third column "d" denotes a distance along the optical axis from each lens surface to the next lens surface, the fourth column "nd" denotes a refractive index at d-line, and the fifth column "vd" denotes an Abbe number at d-line. The explanation of the specification Table is the same in the other Examples.

TABLE 2

| m | r | d | nd | vd |
|---|---|---|---|---|
| 1 | 75.043 | 5.1 | 1.623 | 57.0 |
| 2 | −75.043 | 2 | 1.750 | 35.2 |
| 3 | 1600.58 | 7.5 | | |
| 4 | 50.256 | 5.1 | 1.668 | 42.0 |
| 5 | −84.541 | 1.8 | 1.613 | 44.4 |
| 6 | 36.911 | 5.5 | | |

Example 1

FIG. 1 used in the above explanation shows an objective lens OL according to Example 1 of the present invention. As described above, the objective lens OL1 includes, in order from an object side, a first lens group G1 having positive refractive power, a second lens group G2 having positive refractive power, and a third lens group G3 having negative refractive power, and a diffractive optical element GD is disposed between the second lens group G2 and the third lens group G3. The first lens group G1 is composed of a positive meniscus lens L1 having a concave surface facing the object side, a cemented lens constructed by a double convex positive lens L2 and a negative meniscus lens L3 having a concave surface facing the object side cemented in this order with each other, and a double convex positive lens L4. The second lens group G2 is composed of a cemented lens constructed by a double convex positive lens L5, a double concave negative lens L6 and a double convex positive lens L7 cemented in this order with each other, and a cemented lens constructed by a double convex positive lens L8 and a double concave negative lens L9 cemented in this order with each other. The third lens group G3 is composed of a positive meniscus lens L14 having a concave surface facing the object side cemented with a double concave negative lens L15.

As described above, the diffractive optical element GD is constructed by an optical glass L10, two optical members L11 and L12 made from different resin materials with each other, and an optical glass L13 cemented in this order with each other, and a diffraction grating (diffractive optical surface D) is formed on the cemented surface between the optical members L11 and L12. In other words, the diffractive optical element GD is a close-contact multi-layer type diffractive optical element.

Various values associated with the objective lens OL1 according to Example 1 shown in FIG. 1 are listed in Table 3. In Table 3, "fa" denotes a focal length of the objective lens OL1, "NA" denotes a numerical aperture, "β" denotes magnification, and "d0" denotes a distance along an optical axis between an object and the vertex of the first lens (L1). The surface number of each lens surface shown in the first column "m" corresponds to the surface numbers 1 through 23, in which the number attached with "*" to the right side shows the lens surface on which the diffractive optical surface is formed. In the second column "r", in the case of the diffractive optical surface, a radius of curvature of the reference sphere of the aspherical surface, which becomes a base, is shown. In Table 3, values for conditional expressions (1) through (4) are also shown. This explanation is the same as the following Examples. In respective tables for various values, "mm" is generally used for the unit of length such as the focal length fa, the radius of curvature r and the distance to the next lens surface d. However, since similar optical performance can be obtained by an optical system proportionally enlarged or reduced its dimension, the unit is not necessarily to be limited to "mm", and any other suitable unit can be used.

TABLE 3 fa = 4
NA = 0.55
β = 50
d0 = 12.10

| m | r | d | nd | vd |
|---|---|---|---|---|
| 1 | −18.980 | 2.78 | 1.903 | 35.7 |
| 2 | −11.572 | 0.09 | | |
| 3 | 126.510 | 4.19 | 1.498 | 82.5 |
| 4 | −16.020 | 1.11 | 1.795 | 28.7 |
| 5 | −24.548 | 0.11 | | |
| 6 | 109.123 | 4.00 | 1.498 | 82.5 |
| 7 | −25.541 | 0.16 | | |
| 8 | 41.299 | 4.53 | 1.498 | 82.5 |
| 9 | −18.870 | 1.28 | 1.613 | 44.3 |
| 10 | 13.795 | 4.49 | 1.498 | 82.5 |
| 11 | −45.604 | 0.08 | | |
| 12 | 23.853 | 3.94 | 1.498 | 82.5 |
| 13 | −20.925 | 0.96 | 1.723 | 38.0 |
| 14 | 71.692 | 2.96 | | |
| 15 | ∞ | 2.00 | 1.517 | 64.1 |
| 16 | ∞ | 0.20 | 1.557 | 50.2 |
| 17 | ∞ | 0.00 | 10001.000 | |
| 18* | ∞ | 0.20 | 1.528 | 34.7 |
| 19 | ∞ | 2.00 | 1.517 | 64.1 |
| 20 | ∞ | 13.00 | | |
| 21 | −24.965 | 1.49 | 1.847 | 23.8 |
| 22 | −5.937 | 0.99 | 1.640 | 60.1 |
| 23 | 6.382 | | | |

[Aspherical Surface Data]
Surface Number: 18

$K = 1$
$C2 = -3.84615 \times 10^{-08}$
$C4 = -6.10986 \times 10^{-12}$
$C6 = 4.20109 \times 10^{-14}$
$C8 = -4.07645 \times 10^{-16}$

[Values for Conditional Expressions]

Figure 2:
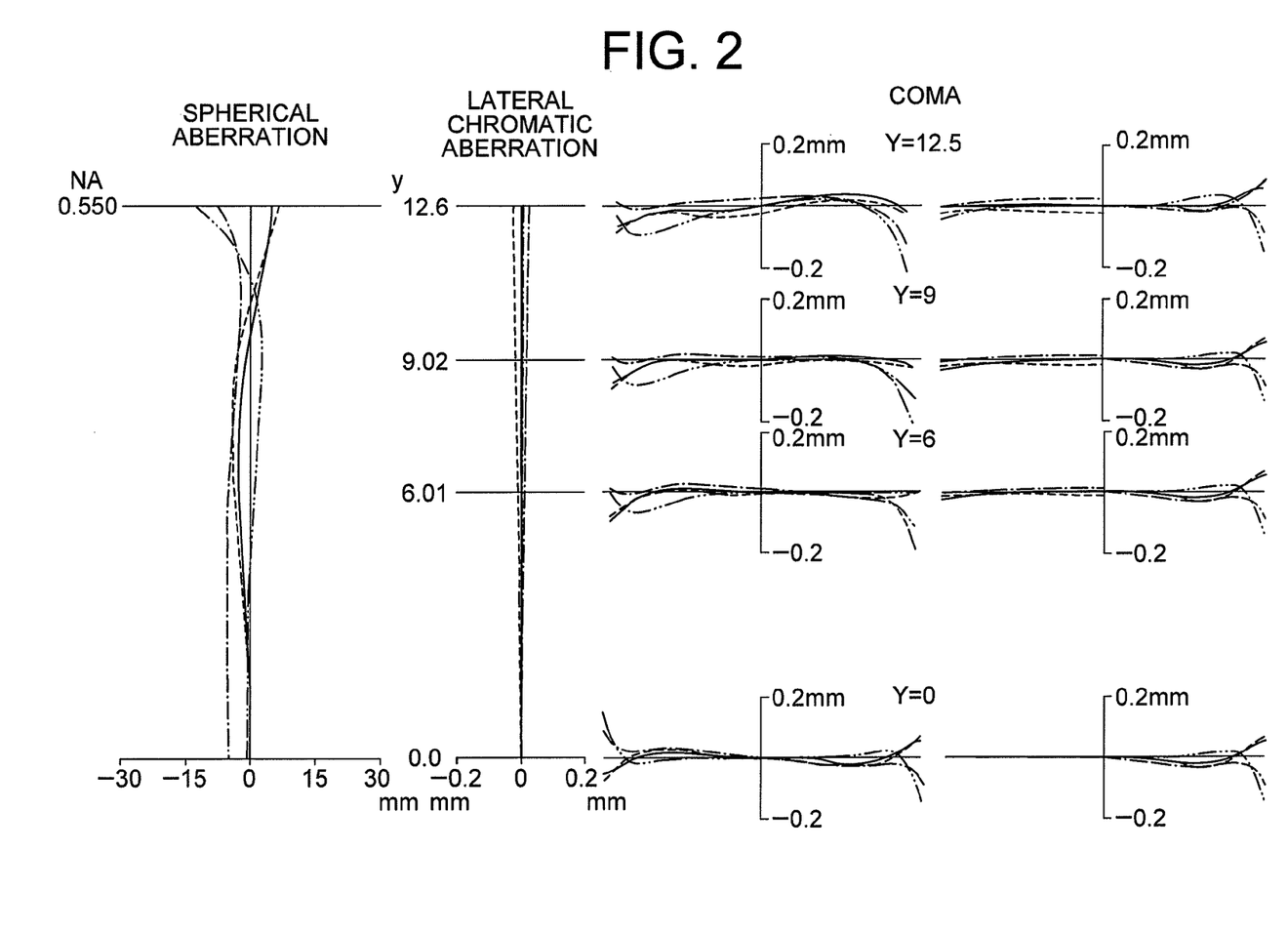
FIG. 2 shows various aberrations of the objective lens according to Example 1.

(1) Left Side = 0.21, Right Side = 0.28
(2) Left Side = 5.78, Right Side = 6.80
(3) $|\Phi 1| = 0.019$, $|\Phi 2| = 0.006$, $|\Phi 3| = 0.008$, $|\Phi 4| = 0.011$
(4) $|f3/fa| = 2.48$ In [values for conditional Expressions] shown in Table 3, in conditional expression (3), $\Phi 1$ denotes power of the fourth surface, $\Phi 2$ denotes power of the ninth surface, $\Phi 3$ denotes power of the tenth surface, and $\Phi 4$ denotes power of the thirteenth surface. It is understood that conditional expressions (1) through (4) are all satisfied in Example 1. In FIG. 2, spherical aberration, lateral chromatic aberration and coma with respect to d-line, g-line, C-line and F-line regarding Example 1 are shown. In respective graphs, a solid line denotes d-line, a dotted line denotes C-line, a chain line denotes F-line, and a chain double-dotted line denotes g-line. In graphs showing spherical aberration, a numerical aperture NA with respect to the maximum aperture is shown. In graphs showing coma, values with respect to the image height Y=12.5 mm, 9 mm, 6 mm and 0 mm are shown. The above described explanation for aberrations is the same as the other Examples. As is apparent from various aberrations shown in FIG. 2, Example 1 shows superb optical performance as a result of good corrections to various aberrations.

Example 2

Figure 3:
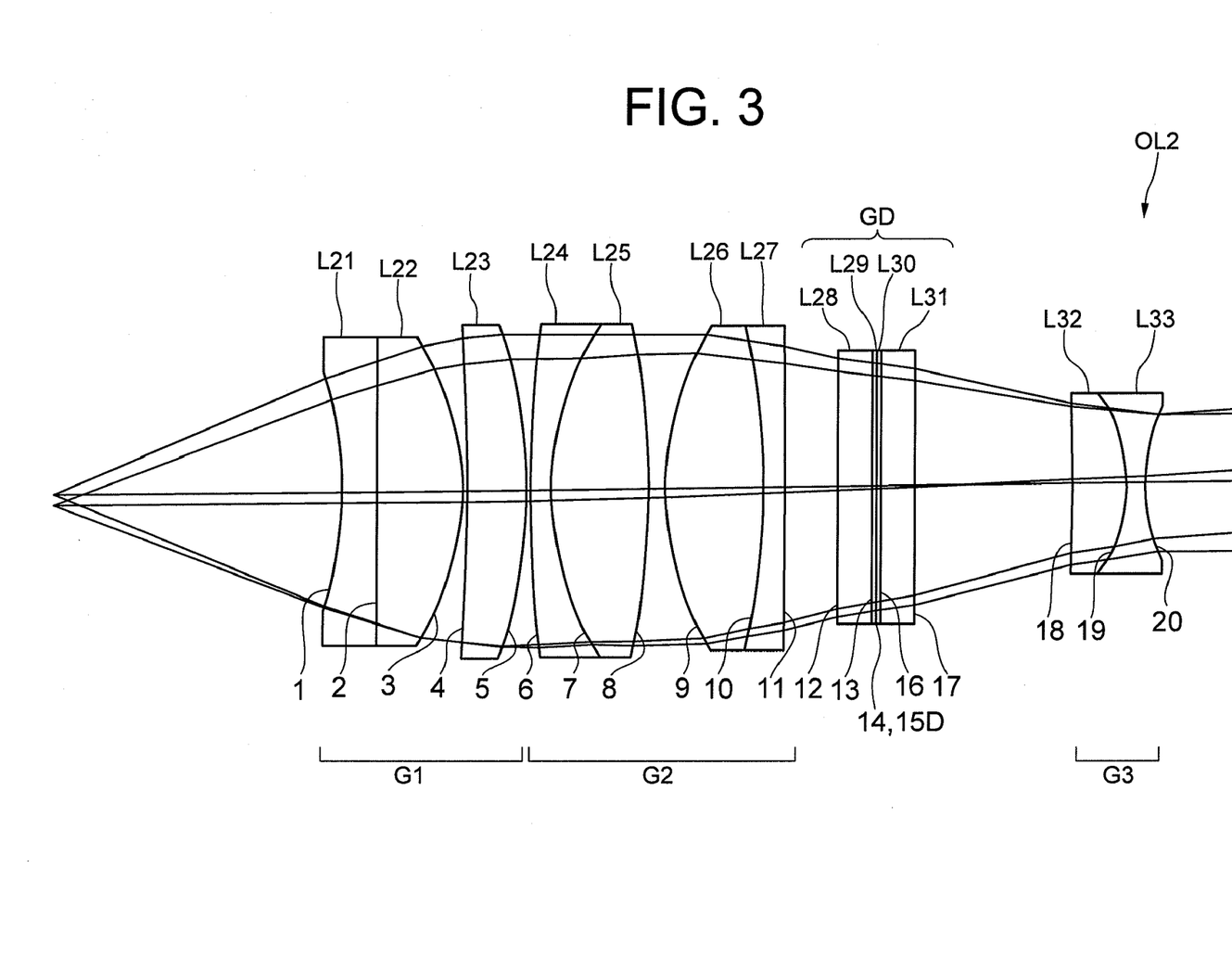
FIG. 3 is a schematic diagram showing a lens construction of an objective lens according to Example 2 of the present invention.

Then, an objective lens OL2 shown in FIG. 3 is explained as Example 2. The objective lens OL2 shown in FIG. 3 also includes, in order from an object side, a first lens group G1 having positive refractive power, a second lens group G2 having positive refractive power, and a third lens group G3 having negative refractive power, and a diffractive optical element GD is disposed between the second lens group G2 and the third lens group G3. The first lens group G1 is composed of a cemented lens constructed by a piano-concave negative lens L21 having a concave surface facing the object side and a piano-convex positive lens L22 having a convex surface facing an image side cemented in this order with each other, and a positive meniscus lens L23 having a concave surface facing the object side. The second lens group G2 is composed of a cemented lens constructed by a negative meniscus lens L24 having a convex surface facing the object side and a double convex positive lens L25 cemented in this order with each other, and a cemented lens constructed by a double convex positive lens L26 and a double concave negative lens L27 cemented in this order with each other. The third lens group G3 is composed of a cemented lens constructed by a positive meniscus lens L32 having a concave surface facing the object side and a double concave negative lens L33 cemented in this order with each other.

Similar to Example 1, the diffractive optical element GD is composed of an optical glass L28, two optical members L29 and L30 each made from different resin materials, and an optical glass L31 cemented in this order with each other, and a diffraction grating (diffractive optical surface D) is formed on the cemented surface between the optical members L29 and L30.

Various values associated with the objective lens OL2 according to Example 2 shown in FIG. 3 are listed in Table 4. The surface numbers shown in the Table 4 correspond to the surface numbers 1 through 20 shown in FIG. 3.

TABLE 4 fa = 10
NA = 0.4
β = 20
d0 = 16.20

| m | r | d | nd | vd |
|---|---|---|---|---|
| 1 | −26.110 | 1.94 | 1.720 | 34.7 |
| 2 | ∞ | 4.80 | 1.835 | 42.7 |
| 3 | −16.983 | 0.21 | | |
| 4 | −164.215 | 3.31 | 1.603 | 65.4 |
| 5 | −32.740 | 0.20 | | |
| 6 | 75.780 | 1.19 | 1.757 | 31.6 |
| 7 | 17.807 | 5.50 | 1.498 | 82.5 |
| 8 | −52.955 | 1.00 | | |
| 9 | 18.485 | 5.50 | 1.498 | 82.5 |
| 10 | −48.109 | 1.21 | 1.717 | 29.5 |
| 11 | 1988.395 | 3.00 | | |
| 12 | ∞ | 2.00 | 1.517 | 64.1 |
| 13 | ∞ | 0.20 | 1.557 | 50.2 |
| 14 | ∞ | 0.00 | 10001.000 | |
| 15* | ∞ | 0.20 | 1.528 | 34.7 |
| 16 | ∞ | 2.00 | 1.517 | 64.1 |
| 17 | ∞ | 8.70 | | |
| 18 | −369.424 | 3.02 | 1.785 | 25.7 |
| 19 | −9.928 | 1.00 | 1.717 | 47.9 |
| 20 | 11.065 | | | |

TABLE 4-continued fa = 10
NA = 0.4
β = 20
d0 = 16.20

[Aspherical Surface Data]
Surface Number: 15

K = 1
C2 = −3.87597 × 10⁻⁸
C4 = 2.81455 × 10⁻¹⁴
C6 = −7.25117 × 10⁻¹⁶
C8 = −1.14725 × 10⁻¹⁸

[Values for Conditional Expressions]

(1) Left Side = 0.13, Right Side = 0.29
(2) Left Side = 7.26, Right Side = 7.55
(3) |Φ1| = 0, |Φ2| = 0.015, |Φ3| = 0.005
(4) |f3/fa| = 1.66

Figure 4:
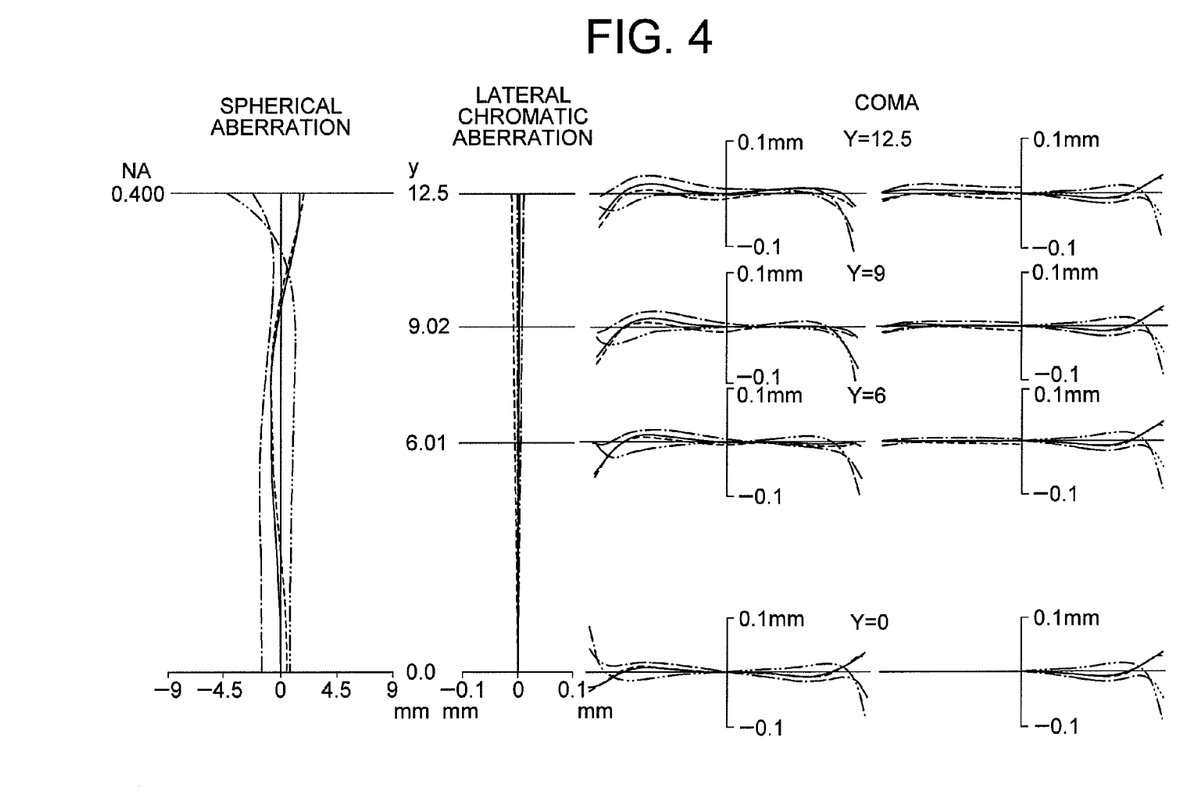
FIG. 4 shows various aberrations of the objective lens according to Example 2.

In [values for conditional Expressions] shown in Table 4, in conditional expression (3), Φ1 denotes power of the second surface, Φ2 denotes power of the seventh surface, and Φ3 denotes power of the tenth surface. It is understood that conditional expressions (1) through (4) are also all satisfied in Example 2. In FIG. 4, spherical aberration, lateral chromatic aberration and coma regarding Example 2 are shown. As is apparent from various aberrations shown in FIG. 4, Example 2 shows superb optical performance as a result of good corrections to various aberrations.

Example 3

Figure 5:
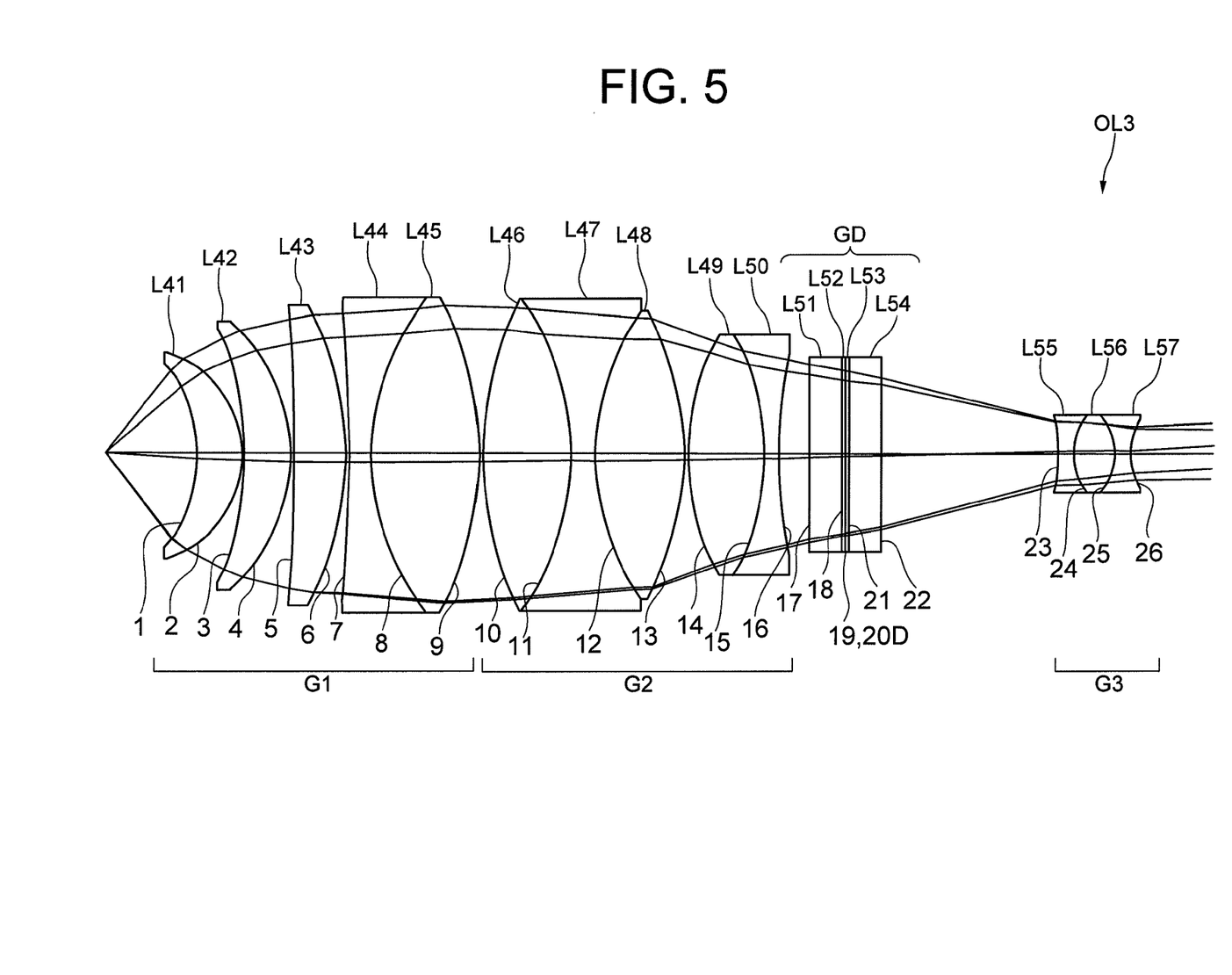
FIG. 5 is a schematic diagram showing a lens construction of an objective lens according to Example 3 of the present invention.

Moreover, an objective lens OL3 shown in FIG. 5 is explained as Example 3. The objective lens OL3 shown in FIG. 5 also includes, in order from an object side, a first lens group G1 having positive refractive power, a second lens group G2 having positive refractive power, and a third lens group G3 having negative refractive power, and a diffractive optical element GD is disposed between the second lens group G2 and the third lens group G3. The first lens group G1 is composed of a positive meniscus lens L41 having a concave surface facing the object side, a positive meniscus lens L42 having a concave surface facing the object side, a positive meniscus lens L43 having a concave surface facing the object side, and a cemented lens constructed by a double concave negative lens L44 and a double convex positive lens L45 cemented in this order with each other. The second lens group G2 is composed of a cemented lens constructed by a double convex positive lens L46, double concave negative lens L47 and a double convex positive lens L48 cemented in this order with each other, and a cemented lens constructed by a double convex positive lens L49 and a double concave negative lens L50 cemented in this order with each other. The third lens group G3 is composed of a cemented lens constructed by a double concave negative lens L55, a double convex positive lens L56 and a double concave negative lens L57 cemented in this order with each other.

Similar to Examples 1 and 2, the diffractive optical element GD is composed of an optical glass L51, two optical members L52 and L53 made from different resin materials from each other, and an optical glass L54 cemented in this order with each other, and a diffraction grating (diffractive optical surface D) is formed on the cemented surface between the optical members L52 and L53.

Various values associated with the objective lens OL3 according to Example 3 shown in FIG. 5 are listed in Table 5. The surface numbers shown in the Table 5 corresponds to the surface numbers 1 through 26 shown in FIG. 5.

TABLE 5 fa = 2
NA = 0.8
β = 100
d0 = 5.62

| m | r | d | nd | νd |
|---|---|---|---|---|
| 1 | −9.091 | 2.78 | 1.835 | 42.7 |
| 2 | −6.831 | 0.11 | | |
| 3 | −20.141 | 2.90 | 1.603 | 65.4 |
| 4 | −11.278 | 0.16 | | |
| 5 | −129.471 | 3.21 | 1.498 | 82.5 |
| 6 | −19.912 | 0.21 | | |
| 7 | −78.960 | 1.30 | 1.624 | 47.1 |
| 8 | 16.671 | 6.71 | 1.498 | 82.5 |
| 9 | −21.356 | 0.20 | | |
| 10 | 24.291 | 5.47 | 1.498 | 82.5 |
| 11 | −17.070 | 1.48 | 1.654 | 39.7 |
| 12 | 16.853 | 5.50 | 1.498 | 82.5 |
| 13 | −18.406 | 0.18 | | |
| 14 | 17.067 | 4.63 | 1.498 | 82.5 |
| 15 | −16.869 | 0.97 | 1.804 | 46.6 |
| 16 | 35.410 | 1.83 | | |
| 17 | ∞ | 2.00 | 1.517 | 64.1 |
| 18 | ∞ | 0.20 | 1.557 | 50.2 |
| 19 | ∞ | 0.00 | 10001.000 | |
| 20* | ∞ | 0.20 | 1.528 | 34.7 |
| 21 | ∞ | 2.00 | 1.517 | 64.1 |
| 22 | ∞ | 10.95 | | |
| 23 | −12.648 | 0.98 | 1.744 | 44.8 |
| 24 | 4.497 | 2.47 | 1.755 | 27.5 |
| 25 | −3.748 | 0.96 | 1.624 | 47.1 |
| 26 | 4.851 | | | |

[Aspherical Surface Data]
Surface Number: 20

K = 1
C2 = −3.87597 × 10⁻⁸
C4 = −6.36546 × 10⁻¹³
C6 = 3.74049 × 10⁻¹⁵
C8 = 7.79187 × 10⁻¹⁸

[Values for Conditional Expressions]

(1) Left Side = 0.18, Right Side = 0.24
(2) Left Side = 5.36, Right Side = 6.05
(3) |Φ1| = 0.008, |Φ2| = 0.009, |Φ3| = 0.009, |Φ4| = 0.018
(4) |f3/fa| = 3.10

Figure 6:
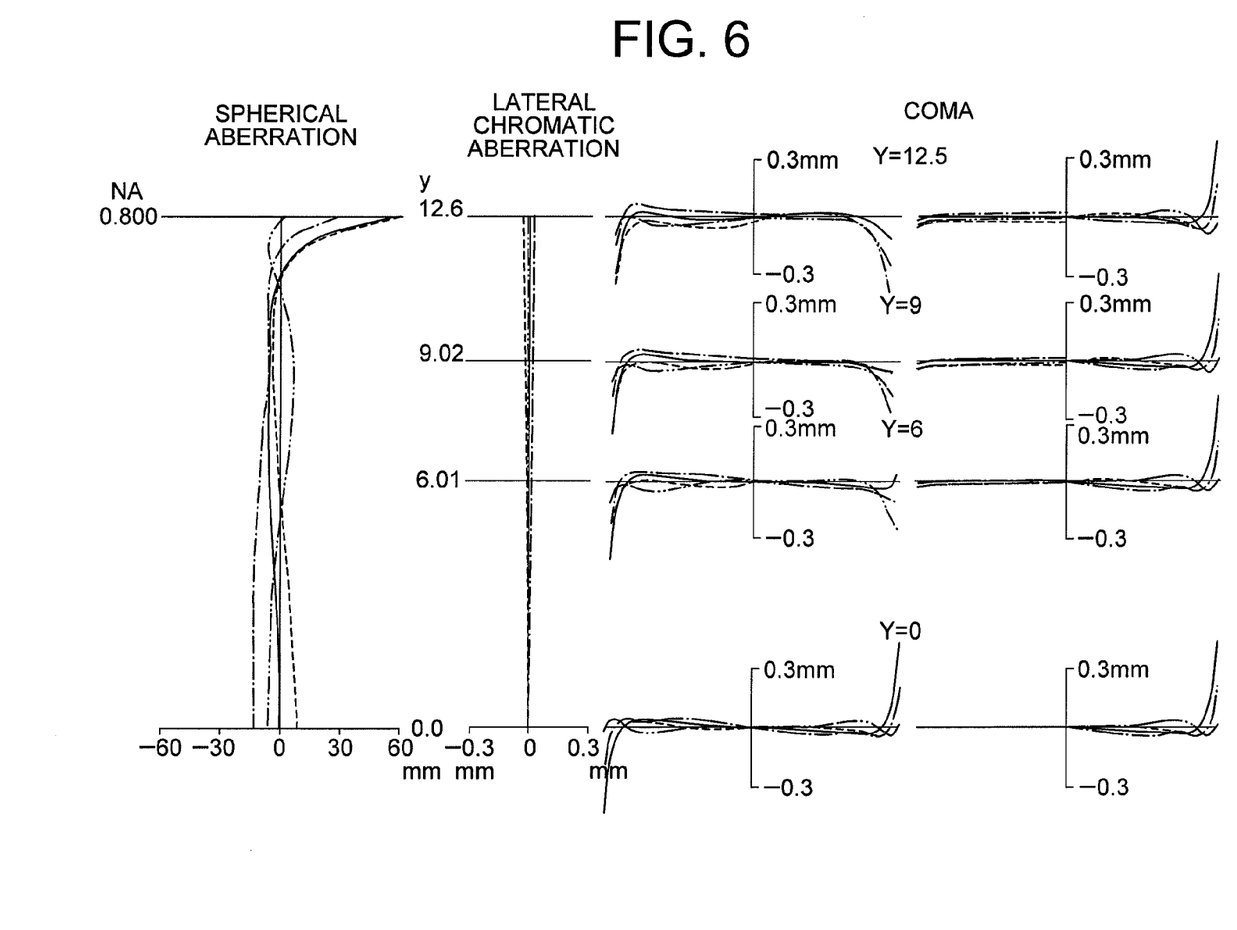
FIG. 6 shows various aberrations of the objective lens according to Example 3.

In [values for conditional Expressions] shown in Table 5, in conditional expression (3), Φ1 denotes power of the eighth surface, Φ2 denotes power of the eleventh surface, Φ3 denotes power of the twelfth surface, and Φ4 denotes power of the fifteenth surface. It is understood that conditional expressions (1) through (4) are also all satisfied in Example 3. In FIG. 6, spherical aberration, lateral chromatic aberration and coma regarding Example 3 are shown. As is apparent from various aberrations shown in FIG. 6, Example 3 shows superb optical performance as a result of good corrections to various aberrations.

What is claimed is:

1. An objective lens comprising, in order from an object side:
   a first lens group having positive refractive power;
   a second lens group having positive refractive power;
   a diffractive optical element having a diffractive optical surface; and
   a third lens group having negative refractive power;
   the most object side surface of the first lens group forming a concave surface facing the object side;

a principal ray crossing an optical axis between the second lens group and the third lens group, and the diffractive optical element being disposed such that the diffractive optical surface is disposed in the vicinity of the position where the principal ray crosses the optical axis; and the following conditional expressions being satisfied:

$$h < \alpha \times L \times 0.3$$

$$H < [H3 + \{\phi/(2 \times fa) + H3/|f3|\} \times L] \times 0.85$$

where $\alpha = \phi/2 \times \{1/fa - (L/f12 - 1)/|f3|\}$, $H3 = fa \times NA$, h denotes the maximum height of a principal ray on the diffractive optical surface, $\phi$ denotes a real field of view, L denotes a distance along the optical axis between the second lens group and the third lens group, fa denotes a focal length of the objective lens, H denotes the maximum effective radius on the diffractive optical surface, NA denotes a numerical aperture, f12 denotes a combined focal length of the first lens group and the second lens group, and f3 denotes a focal length of the third lens group.

2. The objective lens according to claim 1, wherein the following conditional expression is satisfied:

$$1 < |f3/fa| < 5$$

where fa denotes a focal length of the objective lens, and f3 denotes a focal length of the third lens group.

3. The objective lens according to claim 1, wherein each of the first lens group and the second lens group includes at least one cemented lens, and the following conditional expression is satisfied:

$$|\Phi| < 0.025$$

where $\Phi = (n2 - n1)/r$, r denotes a radius of curvature of cemented surface of each of cemented lenses included in the first lens group and the second lens group, n1 denotes a refractive index at d-line of a medium disposed to the object side of the cemented surface, and n2 denotes a refractive index at d-line of a medium disposed to the image side of the cemented surface, and $\Phi$ denotes power of the cemented surface.

4. The objective lens according to claim 3, wherein the following conditional expression is satisfied:

$$1 < |f3/fa| < 5$$

where fa denotes a focal length of the objective lens, and f3 denotes a focal length of the third lens group.

* * * * *